May 24, 1966 J. E. HOUK 3,252,180
ADJUSTABLE GRIP FOR EJECTOR MECHANISM IN AN INJECTION MOLD
Filed June 26, 1963 2 Sheets-Sheet 1
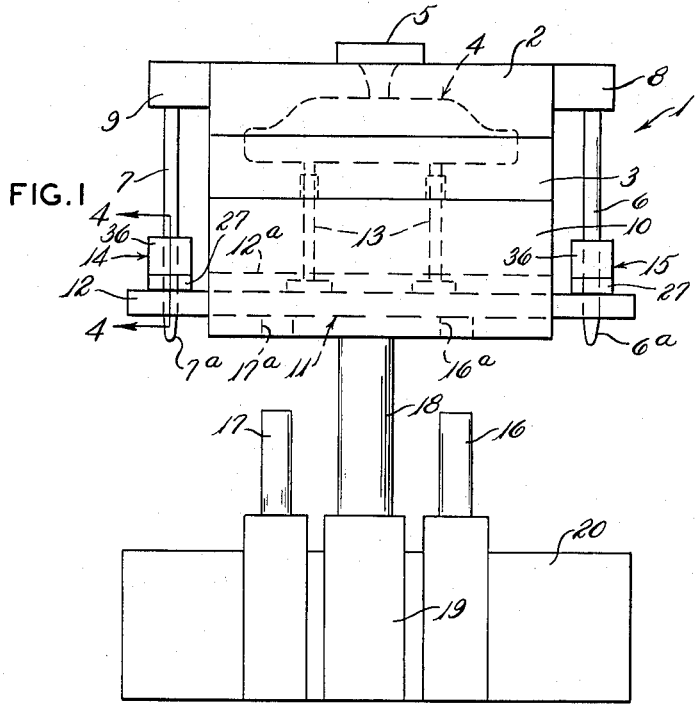
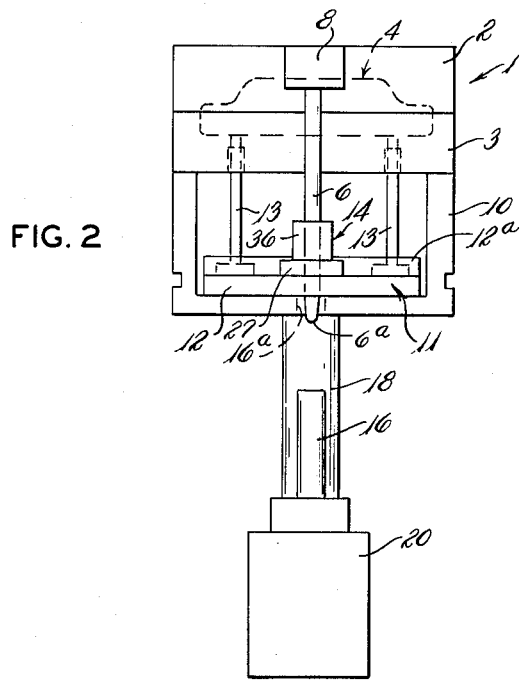
INVENTOR.
JOHN E. HOUK
BY
ATTYS.

May 24, 1966 J. E. HOUK 3,252,180
ADJUSTABLE GRIP FOR EJECTOR MECHANISM IN AN INJECTION MOLD
Filed June 26, 1963 2 Sheets-Sheet 2

INVENTOR.
JOHN E. HOUK
BY
ATTYS.

United States Patent Office

3,252,180
Patented May 24, 1966

3,252,180
ADJUSTABLE GRIP FOR EJECTOR MECHANISM IN AN INJECTION MOLD
John E. Houk, Akron, Ohio, assignor to Houk Machine Co., Barberton, Ohio, a corporation of Ohio
Filed June 26, 1963, Ser. No. 290,769
3 Claims. (Cl. 18—2)

This invention relates to an adjustable grip that may be used, for example, as an ejector in an injection mold, and more particularly to an adjustable grip apparatus which insures that the ejector in an injection mold is properly withdrawn before the injection mold is closed to proceed with another molding operation.

The art of injection molding has been known for some time. However, the ejectors used in the conventional injection molds have caused considerable trouble because in some instances they are not properly withdrawn when the mold is closed for a subsequent molding process, after having ejected the article previously molded. When the ejector is not properly withdrawn, it causes misformation of the molded article, as well as possible breakage to any forming pins or other forming means inserted into the mold during the article forming process. Heretofore varied means have been utilized to attempt to insure that the ejectors are completely withdrawn from the mold prior to the mold closing. These constructions have included spring means and direct contact means but they have not solved the problem satisfactorily. Obviously, in an extremely expensive and complicated injection molding mold and process, it is highly desirable that the ejector means be positively and conclusively withdrawn to prevent possible breakage or misformation of the molded article.

The general object of the invention is to avoid and overcome the foregoing and other difficulties of and objections to prior art practices by the provisions of an adjustable grip means affixed to the ejector means and engaging stationary pins which grip means are freely slidable in one direction on said pins, but highly resistant to movement in the opposite direction on said pins to provide a positive means to insure complete removal of the ejection means prior to closing the mold.

A further object of the invention is to provide a grip means affixed to the ejector means and engaging a stationary pin means, which grip means is freely slidable in one direction on the pin means, but greatly restricted in movement in the opposite direction on the pin means, and which restricted movement on the pin means is adjustable either to increase or decrease the restrictive movement.

Another object of the invention is to provide a positive and adjustable grip means, which is highly effective, durable, and low in cost to provide a positive restrictive force to resist movement of a center rod in one direction but to permit free movement of the center rod in the opposite direction.

Another object of the invention is to provide an adjustable grip means which utilizes ball bearings mounted to move in an inclined race which balls engage a movable pin and thereby allow free movement of the pin in one direction and restricted movement of the pin in the opposite direction as the balls bind between the pin and the inclined race.

The aforesaid objects of the invention and other objects which will become apparent as the description proceeds are achieved by providing, for example, in an injection mold ejector mechanism the combination, as one embodiment of the invention, of gripping means operatively affixed to the ejector mechanism, the gripping means having a circular bore therethrough, a cylindrical pin adapted to slidably pass through the bore of the gripping means in tightly spaced relation thereto, an annular ball bearing comprising a plurality of balls operatively mounted by the gripping means, an annular conically tapered insert operatively mounted in the gripping means to engage the ball bearing on the radially outward side of the bearing, the balls of the bearing engaging the pin on the radially inward side of the bearing, the balls of the bearing tending to roll freely towards the widened portion of the tapered insert when the pin is moved in that direction, the balls of the bearing tending to roll in a binding manner towards the narrow portion of the tapered insert when the pin is moved in the opposite direction, resilient means biasing the bearing towards the narrowed portion of the tapered insert, and means to adjust the biasing action of the resilient means.

For a better understanding of the invention, reference should be had to the accompanying drawings, wherein:

FIG. 1 is a plan view showing one embodiment of the principles of the invention adapted for use with an injection mold;

FIG. 2 is a side elevation of the apparatus shown in FIG. 1;

Figure 3:
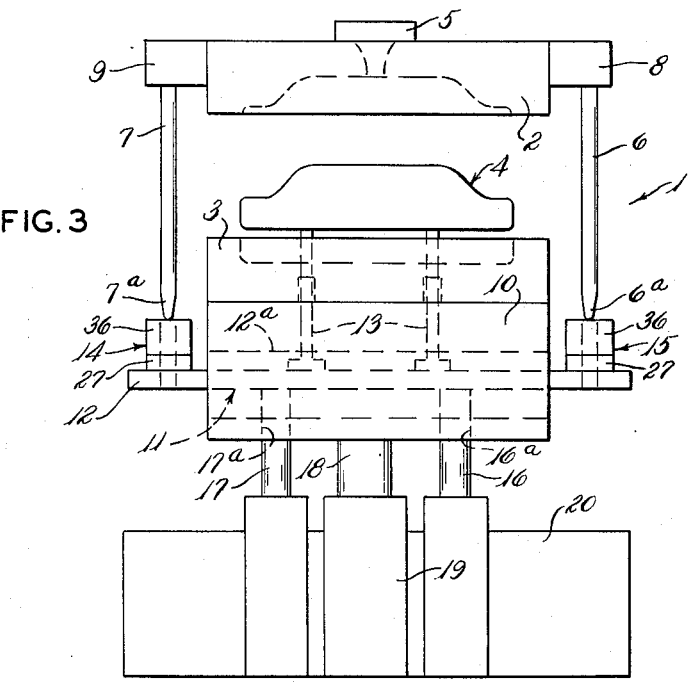
FIG. 3 is a plan view of the embodiment of the invention shown in FIG. 1 with the injection mold in the open position.

Although the principles of the invention are broadly applicable to a gripping means providing free axial movement of a member in one direction and greatly restricted axial movement of the member in the opposite direction, and which restrictive movement can be adjusted, the invention is especially adapted for use in conjunction with the ejection mechanism of an injection mold, and hence it has been so illustrated and will be so described.

With specific reference to the form of the invention illustrated in FIG. 1 of the drawings, the numeral 1 indicates generally an injection mold comprising a stationary mold housing 2 and a movable mold housing 3 defining or enclosing a mold cavity in which a molded form, or article, indicated generally by the dotted lines 4, is produced. Injection means 5 are provided on the stationary mold housing 2 and connect to conventional means (not shown) to fill the mold with a suitable forming material. In order to mount a pair of sub-assembly guide pins 6 and 7, respectively, extending frames 8 and 9 are provided which are affixed to the stationary mold housing 2. The guide pins have tapered ends 6a and 7a.

The movable mold housing 3 contains a sub-frame assembly 10 which takes the form of a hollow box-like shape, as indicated in FIG. 2, in order to provide a sliding support for the ejector mechanism indicated generally by the numeral 11. The ejector mechanism, indicated generally by numeral 11 comprises a base ejector plate 12, a top ejector plate 12a, and a plurality of ejector pins 13 usually operatively mounted for limited relative movement between the base plate 12 and the top plate 12a, by suitable means, such as counterbored recesses, or bolts. The ejector pins 13 fit with close sliding tolerance through the movable mold housing 3 to prevent leaking during the injection process. Because of the close tolerance, the pins 13 must be capable of slight relative movement to insure proper alignment. Further, the receiving holes in the movable mold housing 3 may be tapered to thereby better receive the pins 13 during the ejection process. The top plate 12a is affixed to the base plate 12 by suitable means, such as bolts (not shown). Adjustable gripper means 14 and 15, respectively, carried by the base plate 12, receive the stationary pins 6 and 7 through bores therein, and the pins 6 and 7 extend through aligned holes in the base plate 12. The adjustable gripping means 14 and 15 allow free axial movement of the pins 6 and 7 in the direction to open the mold but allow only highly restrictive movement of the pins 6 and 7 therethrough in the direction to close the mold, all as will be more fully explained hereinafter.

In order to control and move the ejector mechanism 11 during mold opening movement, a pair of adjustable plungers 16 and 17 are slidably received in the sub-frame assembly 10 through holes 16a and 17a, respectively. The adjustable plungers 16 and 17 are mounted on suitable means, such as a stationary frame 20. In order to provide movement to the movable mold housing 3, conventional means such as a hydraulic ram, or plunger 18 is affixed to the sub-frame assembly 10 of the movable mold in any known manner. The hydraulic ram 18 is positioned by and controlled by a hydraulic cylinder 19 which is affixed to the stationary frame 20. The mold housing 3 can be moved any suitable distance for mold opening action and it can be associated with the remainder of the apparatus in a conventional manner.

With reference to FIG. 3 the mold assembly, in the apparatus shown, is in the open position by action of the plunger 18 being withdrawn into the cylinder 19 with the adjustable plungers 16 and 17 having contacted the base plate 12 and caused the ejector pins 13 to knock the article 4 from the mold housing 3. It can be seen that when the assembly 1 is returned to the closed position indicated by FIG. 1 that the restrictive axial movement of the pins 6 and 7 through the gripper means 14 and 15, respectively, will positively force the base plate 12 to the completely retracted position, as shown in FIGS. 1 and 2, and that such movement will occur a substantial amount of time before the mold is completely closed. Thus, the object of the invention which was to positively insure complete withdrawal or removal of the ejector mechanism 11 from the mold assembly 1 prior to closing is achieved.

Figure 4:
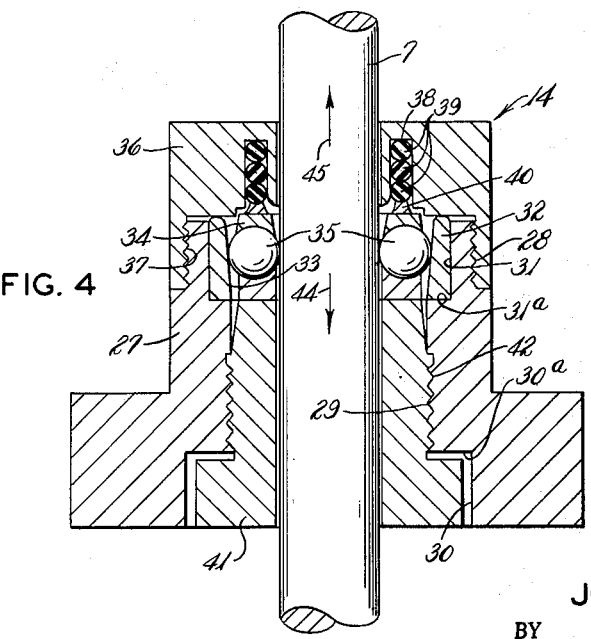
FIG. 4 is an enlarged fragmentary horizontal cross sectional view of the gripping means of the invention taken on line 4—4 of FIG. 1.

In order to more fully understand the operation of the gripper means 14 and 15, reference should be had to FIG. 4 of the drawings wherein details of the one gripper means 14 are shown. It has a center rod, or pin 7 passing through the axial bore, as illustrated. The gripper means 14 comprises an annular base member 27 which is normally mounted on a frame, or in the embodiment illustrated in FIG. 1, the base plate 12. The base member 27 has an outer threaded end position 28 and an inner threaded portion 29. The bore of the base is counterbored at each end to form annular recesses 30 and 31, respectively, at each end of the member 27, by shoulders 30a and 31a.

An annular insert 32, having a conically tapered annular bore therethough, is press fit, or secured in some convenient manner, in the recess 31 of the member 27. A ball bearing 34, containing a plurality of balls 35, is operatively positioned between the tapered surface 33 of the insert 32 and the pin 7. An annular cap 36, having a recessed internally threaded end portion 37, is removably screwed to the externally threaded portion 28 of the base member 27. Further, the cap 36 contains an internal recess 38 adapted to receive resilient means, such as compressible rubber O-rings 39 or suitable spring means, which engage an annular ring 40. Such annular ring resiliently urges the balls 35 of the bearing 34, which extend laterally therefrom on both sides thereof, into contact between the tapered inner surface 33 of the insert 32 and the peripheral surface of the pin 7. In order to provide adjustment of the O-rings 39 providing resilient bias to the bearing 34, an adjustable annular nut 41, having an outer threaded portion 42 which is removably screwed to the internally threaded portion 29 of base member 27, is provided. The adjustable nut 41 operatively engages with the bearing 34 on the end opposite to the O-rings 39 in order to provide axial movement to the bearing 34 to thereby adjust the amount of clearance between the tapered surface 33 of the insert 32, the balls 35, and the outer peripheral surface of the pin 7.

As is obvious from the foregoing description of the gripper means 14, if the pin 7 is moved axially in the direction indicated by the arrow 44, the balls 35 of the bearing 34 tend to roll against the tapered surface 33 of the insert 32 to bind between the narrowed space causing greatly restricted movement of the pin 7 through the gripper means 14 in that direction. Conversely, if the pin 7 is moved axially in the direction indicated by the arrow 45, the balls 35 will tend to roll towards the widened portion of the tapered surface 33 to allow free movement of the pin 7 in that direction. Obviously, the position of the adjusting nut 41 controls the axial movement of the bearing 34 and consequently controls the binding and gripping axial movement of the pin 7 in the direction indicated by the arrow 44. If the nut 41 is positioned, as indicated in FIG. 4, so that the balls 35 are only lightly in contact with the surface 33 of the insert 32 and the outer peripheral surface of the pin 7, there will be only very light binding or gripping action. However, as the nut 41 is moved axially in the direction of the arrow 44, the resilient biasing action of the O-rings 39 greatly increases the amount of binding and gripping action achieved. Conversely, if the nut 41 is moved in the direction of the arrow 45, the binding and gripping action achieved is substantially lessened.

Thus, a unique, adjustable, durable, and highly effective gripping means 14 is provided utilizing O-rings 39, ball bearing 34, tapered insert 32, and adjustable nut 41 to thereby controllably maintain a binding and gripping action on the pin 7 when the pin 7 is moved in the direction of the arrow 44, and allowing free axial movement of the pin 7 when moved in the direction of the arrow 45. The pin 7, balls 35, and tapered insert 32 are made from suitable materials, such as a hard steel to provide durability.

It will be recognized that the mechanism of the invention will function on any relative axial movement between the pin 7 and the gripping means 25. The pin 7 must have some locking ball or roller associated therewith and engaging a tapered surface. By providing a gentle taper such as about 1°, on the tapered surface 33, the adjustment of the locking and release action of the gripper means is facilitated.

It will be recognized that the objects of the invention have been achieved by providing a unique gripper means suitable for use in conjunction with ejector mechanism in an injection mold to provide positive action insure that the ejector mechanism is retracted from the mold prior to the mold closing for an injection molding process.

While in accordance with the patent statutes one best known embodiment of the invention has been illustrated and described in detail, it is to be particularly understood that the invention is not limited thereto or thereby, but that the inventive scope is defined in the appended claims.

What is claimed is:

1. In an injection molding mechanism, the combination of a stationary mold means, a movable mold means to engage said stationary mold means and define a mold cavity, means engaging said movable mold means to control the position thereof and move it towards and away from said stationary mold means, an ejector mechanism movable relative to said movable mold means and operatively secured thereto, said ejector means including ejector pins adapted to be moved to extend into said mold cavity upon mold opening movement to eject an article therein, gripping means operatively affixed to said ejector mechanism, said gripping means having a circular bore therethrough, and a stationary cylindrical member secured to said stationary mold means and slidably passing through said bore of said gripping means, said gripping means including:

an annular ball bearing comprising a plurality of balls operatively mounted in said gripping means, an annular conically tapered insert having a smaller and a larger diameter end operatively mounted in said bore of said gripping means to engage said balls of said ball bearing on the radially outward side of said bearing, said balls of said bearing engaging said cylindrical member on the radially inward side of said bearing, said balls of said bearing tending to roll freely toward the larger diameter end of said tapered insert when said gripping means is moved relative to said cylindrical member towards the mold opening position, said balls of said bearing greatly restricting the movement of said gripping means relative to said cylindrical member when said gripping means is moved relative to said cylindrical member for mold closing movement, resilient means biasing said ball bearing towards the narrowed portion of said tapered insert, and means carried by said gripping means and engaging said ball bearing to adjust the biasing action of said resilient means.

2. In an injection molding mechanism, the combination of a stationary mold means, a movable mold means to engage said stationary mold means and define a mold cavity, reciprocal power operated means engaging said movable mold means to control the position thereof and move it from mold open to mold closed position, an ejector mechanism movable relative to said movable mold means and operatively secured thereto, said ejector mechanism being movable in a direction away from both of said mold means, said ejector means including ejector pins adapted to be moved to extend into said mold cavity upon mold opening movement to eject an article therein, gripping means operatively affixed to said ejector mechanism, said gripping means having a circular bore therethrough, and a stationary cylindrical member secured to said stationary mold means slidably passing through said bore of said gripping means, said gripping means including:

an annular ball bearing means comprising a plurality of balls operatively mounted in said gripping means, an annular conically tapered metal insert having a smaller and a larger diameter end operatively mounted in said bore of said gripping means to engage said balls of said ball bearing means on the radially outward side of said bearing, said balls of said bearing engaging said member on the radially inward side of said bearing, said balls of said bearing tending to roll freely toward the larger diameter end of said tapered insert when said gripping means is moved relative to said member towards the mold opening position, said balls of said bearing means restricting the movement of said gripping means relative to said member when said gripping means is moved relative to said member for mold closing movement to move said ejector means away from both of said mold means prior to said mold means being moved to a closed position, resilient means biasing said ball bearing means towards the narrowed portion of said tapered insert, and means carried by said gripping means and engaging said ball bearing means to adjust the biasing action of said resilient means.

3. In an injection molding mechanism, the combination of a stationary mold, a movable mold to engage said stationary mold and define a mold cavity, means engaging said movable mold to control the position thereof and move it towards and away from said stationary mold in substantially parallel relation thereto, an ejector mechanism movable away from said movable mold means and operatively secured thereto, said ejector means including ejector pins adapted to be moved to extend into said mold cavity upon mold opening movement to eject an article therein, a pair of gripping means operatively affixed to lateral marginal portions of said ejector mechanism, each of said gripping means having a circular bore therethrough, and a pair of stationary cylindrical pins secured to said stationary mold means and individually slidably passing through the said bores of said gripping means, each said gripping means including:

an annular ball bearing means comprising a plurality of balls operatively mounted in said gripping means, an annular conically tapered metal insert having a smaller and a larger diameter end operatively mounted in said broe of said gripping means to engage said balls of said ball bearing means on the radially outward side of said bearing, said balls of said ball bearing means engaging said pin on the radially inward side of said bearing, said balls of said bearing tending to roll freely toward the larger diameter end of said tapered insert when said gripping means is moved relative to said pin towards the mold opening position, said balls of said bearing means engaging said pin to at least restrict the movement of said gripping means relative to said pin when said gripping means is moved relative to said pin for mold closing movement, resilient means biasing said ball bearing means towards the narrowed portion of said tapered insert, and means longitudinally adjustably carried by said gripping means and engaging said ball bearing means to control the relative position thereof to said insert and adjust the biasing action of said resilient means.

References Cited by the Examiner

UNITED STATES PATENTS

| 180,961 | 8/1876 | Thackara et al. | 24—126 |
| 1,031,637 | 7/1912 | Fischer | 24—244 |
| 1,829,760 | 11/1931 | Santiago | 24—136 |
| 2,348,611 | 5/1944 | Davidson | 24—244 |

FOREIGN PATENTS 401,109    5/1933    Great Britain.

J. SPENCER OVERHOLSER, *Primary Examiner.*

M. V. BRINDISI, *Examiner.*

W. L. McBAY, *Assistant Examiner.*